United States Patent
Hattori et al.

(10) Patent No.: US 12,500,796 B2
(45) Date of Patent: Dec. 16, 2025

(54) DATA TRANSMISSION CIRCUIT

(71) Applicant: SONY SEMICONDUCTOR SOLUTIONS CORPORATION, Kanagawa (JP)

(72) Inventors: Takunari Hattori, Kanagawa (JP); Tatsuya Sakae, Kanagawa (JP); Junichiro Shirai, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 25 days.

(21) Appl. No.: 18/569,660

(22) PCT Filed: Dec. 28, 2021

(86) PCT No.: PCT/JP2021/048949
§ 371 (c)(1),
(2) Date: Dec. 13, 2023

(87) PCT Pub. No.: WO2022/269954
PCT Pub. Date: Dec. 29, 2022

(65) Prior Publication Data
US 2024/0275644 A1    Aug. 15, 2024

(30) Foreign Application Priority Data
Jun. 22, 2021    (JP) .................................. 2021-103468

(51) Int. Cl.
*H04L 25/02* (2006.01)
*H03K 19/00* (2006.01)
*H03K 19/0175* (2006.01)

(52) U.S. Cl.
CPC ..... *H04L 25/0292* (2013.01); *H03K 19/0005* (2013.01); *H03K 19/017581* (2013.01); *H04L 25/0276* (2013.01)

(58) Field of Classification Search
CPC . H04L 25/0292; H04L 25/0276; H04L 25/02; H03K 19/0005; H03K 19/017581
(Continued)

(56) References Cited

U.S. PATENT DOCUMENTS 5,455,820 A * 10/1995 Yamada ................ H04L 49/107
370/413
5,619,510 A *  4/1997 Kurano ................. H04L 49/107
370/417
(Continued)

FOREIGN PATENT DOCUMENTS

JP    2005-318264 A    11/2005
JP    2009-049600 A     3/2009
(Continued)

OTHER PUBLICATIONS

International Search Report and Written Opinion of PCT Application No. PCT/JP2021/048949, issued on Mar. 15, 2022, 11 pages of ISRWO.

*Primary Examiner* — Emmanuel Bayard
(74) *Attorney, Agent, or Firm* — CHIP LAW GROUP

(57) ABSTRACT

Provided is a data transmission circuit that includes first and second drive circuits and an operation state control circuit. The first drive circuit drives first data that transitions or does not transition in synchronization with a clock signal. The second drive circuit drives second data that transitions at a timing when the first data does not transition in synchronization with the clock signal. The operation state control circuit individually controls operation states of the first and second drive circuits.

10 Claims, 18 Drawing Sheets

(58) Field of Classification Search
USPC .................. 375/244, 262, 295, 297, 355
See application file for complete search history.

(56) References Cited

U.S. PATENT DOCUMENTS

| | | | |
|---|---|---|---|
| 9,685,944 B1* | 6/2017 | Seshita | H03K 19/00315 |
| 9,748,934 B1 | 8/2017 | Oh et al. | |
| 10,630,292 B1* | 4/2020 | Funabashi | H03M 9/00 |
| 11,218,150 B2* | 1/2022 | Seo | H03K 17/102 |
| 11,688,437 B2* | 6/2023 | Dreesen | G11C 7/065 |
| | | | 365/207 |
| 2012/0198264 A1* | 8/2012 | DeMarco | G06F 1/10 |
| | | | 713/401 |
| 2016/0181795 A1* | 6/2016 | Chin | G09G 3/32 |
| | | | 345/212 |
| 2016/0197612 A1* | 7/2016 | Kang | H03K 19/017545 |
| | | | 326/30 |
| 2016/0359508 A1 | 12/2016 | Hadji-Abdolhamid et al. | |
| 2017/0085361 A1 | 3/2017 | Hood et al. | |
| 2017/0207904 A1* | 7/2017 | Hood | H04B 1/04 |
| 2022/0247402 A1* | 8/2022 | Kuo | H04L 25/0298 |

FOREIGN PATENT DOCUMENTS

| | | |
|---|---|---|
| JP | 2013-211843 A | 10/2013 |
| JP | 2014-192592 A | 10/2014 |
| JP | 2017-076836 A | 4/2017 |

* cited by examiner

FIG. 4

| TERMINATION RESISTANCE VALUE [Ω] | TERMINATION RESISTANCE CODE MAIN |
|---|---|
| 30 | 11010 |
| 40 | 10100 |
| 50 | 10000 |
| 60 | 01101 |
| 70 | 01011 |
| 80 | 01010 |
| 90 | 01001 |
| 100 | 01000 |

| TERMINATION RESISTANCE VALUE [Ω] | TERMINATION RESISTANCE CODE DUMMY | | |
|---|---|---|---|
| | NO BIT SHIFT | 1-BIT SHIFT | 2-BIT SHIFT |
| 30 | 11010 | 01101 | 00110 |
| 40 | 10100 | 01010 | 00101 |
| 50 | 10000 | 01000 | 00100 |
| 60 | 01101 | 00110 | 00011 |
| 70 | 01011 | 00101 | 00010 |
| 80 | 01010 | 00101 | 00010 |
| 90 | 01001 | 00100 | 00010 |
| 100 | 01000 | 00100 | 00010 |

FIG. 10

| UNIT | TERMINATION RESISTANCE CODE DUMMY<2:0> | | | |
|---|---|---|---|---|
| | 000 | 001 | 011 | 111 |
| DRIVER 121-1 (16R_1) | OFF | ON | ON | ON |
| DRIVER 121-2 (16R_2) | OFF | OFF | ON | ON |
| DRIVER 121-3 (16R_3) | OFF | OFF | OFF | ON |

DATA TRANSMISSION CIRCUIT

CROSS REFERENCE TO RELATED APPLICATIONS

This application is a U.S. National Phase of International Patent Application No. PCT/JP2021/048949 filed on Dec. 28, 2021, which claims priority benefit of Japanese Patent Application No. JP 2021-103468 filed in the Japan Patent Office on Jun. 22, 2021. Each of the above-referenced applications is hereby incorporated herein by reference in its entirety.

TECHNICAL FIELD

The present technology relates to a data transmission circuit. Specifically, the present technology relates to a data transmission circuit that transmits data driven by a driver.

BACKGROUND ART

With an increase in data transmission speed, it is important to design a driver, which is an output unit in a data transmission circuit of an interface, so as not to deteriorate waveform quality. A jitter characteristic is one of factors that determine the waveform quality, and a power supply noise is one of factors that deteriorate the jitter characteristic. In order to suppress the power supply noise, a capacitor is inserted between the power supply and the ground in parallel with a circuit. It is thus possible to suppress a high frequency noise; however, it is difficult to suppress a low frequency noise. Therefore, a noise cancellation circuit has been proposed as a technique for removing a low frequency noise generated depending on a data pattern (see, for example, Patent Document 1).

CITATION LIST

Patent Document

Patent Document 1: Japanese Patent Application Laid-Open No. 2005-318264

SUMMARY OF THE INVENTION

Problems to be Solved by the Invention

The conventional technique described above uses, in addition to a main driver, a dummy driver through which a current equivalent to a current passing through the main driver passes. That is, a power supply noise depending on a data pattern is canceled by operating the dummy driver at a timing when the main driver is not operating. However, in this conventional technique, since the current equivalent to the current passing through the main driver passes through the dummy driver, there is a problem that power consumption is simply doubled and thus increased.

The present technology has been devised in view of such a situation, and an object thereof is to suppress a power supply noise while reducing power consumption in a data transmission circuit.

Solutions to Problems

The present technology has been made to solve the problem described above and a first aspect of the present technology is directed to a data transmission circuit including: a first drive circuit configured to drive first data that transitions or does not transition in synchronization with a clock signal; a second drive circuit configured to drive second data that transitions at a timing when the first data does not transition in synchronization with the clock signal; and an operation state control circuit configured to individually control operation states of the first and second drive circuits. This configuration produces an advantageous effect of individually controlling the operation states of the first and second drive circuits to reduce power consumption in accordance with a required jitter characteristic.

Furthermore, in the first aspect, the data transmission circuit may further include a data generation circuit configured to generate first serial data as the first data that transitions or does not transition in synchronization with the clock signal, by converting input parallel data, and configured to generate second serial data as the second data that transitions at the timing when the first data does not transition in synchronization with the clock signal. This configuration produces an advantageous effect of supplying the first and second data to the first and second drive circuits.

Furthermore, in the first aspect, the second drive circuit may include a plurality of drivers, and the operation state control circuit may control the operation state of the second drive circuit by controlling the number of operating drivers among the plurality of drivers of the second drive circuit. This configuration produces an advantageous effect of controlling the number of operating drivers in the second drive circuit to reduce power consumption in accordance with a required jitter characteristic.

Furthermore, in the first aspect, the first drive circuit may include a plurality of drivers, and the operation state control circuit may generate a first control signal that indicates presence or absence of operation for each of the plurality of drivers of the first drive circuit by a bit pattern and a second control signal that indicates presence or absence of operation for each of the plurality of drivers of the second drive circuit by a bit pattern. In this case, the second control signal may be obtained by bit-shifting at least a part of the bit pattern of the first control signal in a predetermined direction.

Furthermore, in the first aspect, a shift amount of the bit shift in the second control signal may be represented by an integer value, or may be represented by a decimal value different from an integer.

Furthermore, in the first aspect, the operation state control circuit may generate the second control signal in accordance with a desired termination resistance by the plurality of drivers of the second drive circuit. Furthermore, the operation state control circuit may generate the second control signal on the basis of desired current consumption in the plurality of drivers of the second drive circuit.

Furthermore, in the first aspect, the second drive circuit may include, in at least one stage, a driver group including a plurality of drivers multistage-connected in series, and the second control signal may be obtained by bit-shifting at least a part of a corresponding bit pattern of the first control signal in a predetermined direction for the plurality of drivers in an arbitrary stage of the second drive circuit.

Furthermore, in the first aspect, in the plurality of drivers of the second drive circuit, when a termination resistance value of one driver is assumed as a base, a termination resistance value of another driver may be obtained by multiplying the base by a power of two. Furthermore, in the plurality of drivers of the second drive circuit, at least two or more of the drivers may have the same termination resistance value.

Furthermore, in the first aspect, the second drive circuit may include a plurality of current sources configured to supply current to an internal driver, and the operation state control circuit may control the operation state of the second drive circuit by controlling the number of operating current sources among the plurality of current sources of the second drive circuit. This configuration produces an advantageous effect of controlling the number of operating current sources of the second drive circuit to reduce power consumption in accordance with a required jitter characteristic.

BRIEF DESCRIPTION OF DRAWINGS

FIG. 4 is a diagram illustrating an example of a termination resistance code main table 141 in the first embodiment of the present technology.

FIG. 5 is a diagram illustrating an example of a termination resistance code dummy table 142 in the first embodiment of the present technology.

FIG. 10 is a diagram illustrating an example of control by a thermometer code in the second embodiment of the present technology.

MODE FOR CARRYING OUT THE INVENTION

Hereinafter, modes for carrying out the present technology (hereinafter, referred to as embodiments) will be described. The description will be given in the following order.

1. First embodiment (example of controlling number of drivers by binary code)
2. Second embodiment (example of control by thermometer code)
3. Third embodiment (example of decimal bit shift)
4. Fourth embodiment (application example to multistage connection driver)
5. Fifth embodiment (example of controlling number of current sources)

1. First Embodiment

Data Transmission Circuit

Figure 1:
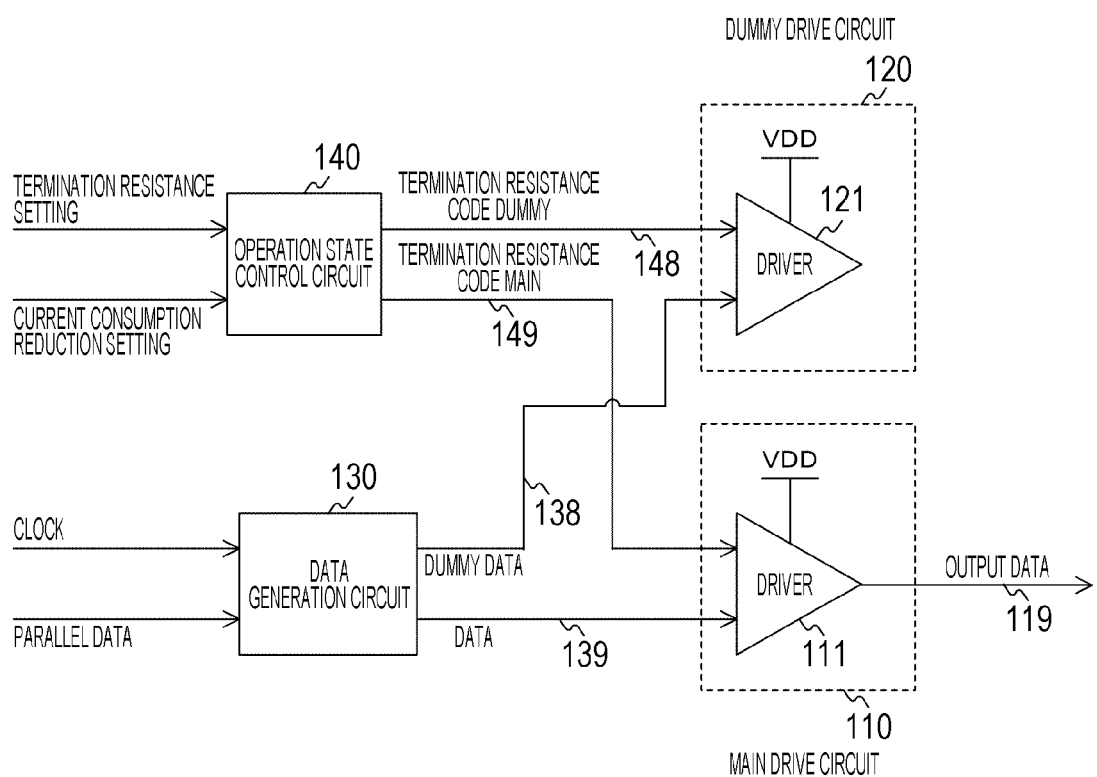
FIG. 1 is a diagram illustrating an example of a configuration of a data transmission circuit in a first embodiment of the present technology.

FIG. 1 is a diagram illustrating an example of a configuration of a data transmission circuit in a first embodiment of the present technology. The data transmission circuit is an output unit of an interface with an external device, and includes a main drive circuit 110, a dummy drive circuit 120, a data generation circuit 130, and an operation state control circuit 140.

The main drive circuit 110 is a circuit that outputs data to an external device. The main drive circuit 110 drives data supplied from the data generation circuit 130 via a signal line 139.

Furthermore, the main drive circuit 110 adjusts termination resistance by changing an operation state in accordance with a termination resistance code main supplied from the operation state control circuit 140 via the signal line 149. In the first embodiment, the main drive circuit 110 includes a plurality of drivers 111, and adjusts the termination resistance by changing the number of operating drivers 111. Note that the main drive circuit 110 is an example of a first drive circuit described in the claims.

The dummy drive circuit 120 is a dummy drive circuit for reducing a power supply noise of the main drive circuit 110. The dummy drive circuit 120 drives dummy data supplied from the data generation circuit 130 via a signal line 138. This dummy data transitions at a timing when the data of the signal line 139 does not transition.

Furthermore, the dummy drive circuit 120 adjusts the termination resistance independently of the main drive circuit 110 by changing the operation state in accordance with a termination resistance code dummy supplied from the operation state control circuit 140 via a signal line 148. In the first embodiment, the dummy drive circuit 120 includes a plurality of drivers 121, and adjusts the termination resistance by changing the number of operating drivers 121.

Note that the dummy drive circuit 120 is an example of a second drive circuit described in the claims.

The data generation circuit 130 converts input parallel data into a serial signal in synchronization with a clock signal, and supplies the serial signal as data via the signal line 139. The serialized data takes either a transition state or a non-transition state in synchronization with the clock signal.

Furthermore, the data generation circuit 130 supplies dummy data, which transitions at a timing when the serialized data does not transition, via the signal line 138. That is, only one of the data of the signal line 139 and the dummy data of the signal line 138 transitions in synchronization with the clock signal. Therefore, a power supply noise depending on a data pattern can be canceled.

The operation state control circuit 140 individually controls the operation states of the main drive circuit 110 and the dummy drive circuit 120. The operation state control circuit 140 determines the termination resistance code main in the main drive circuit 110 in accordance with the setting of the termination resistance. Furthermore, the operation state control circuit 140 determines the termination resistance code dummy in the dummy drive circuit 120 in accordance with the setting of the termination resistance and setting of current consumption reduction. Then, the termination resistance code main is supplied to the main drive circuit 110 via the signal line 149, and the termination resistance code dummy is supplied to the dummy drive circuit 120 via the signal line 148. Therefore, the operation state is individually controlled in each of the main drive circuit 110 and the dummy drive circuit 120. That is, in the main drive circuit 110, the termination resistance is adjusted optimally in order to output data, and in the dummy drive circuit 120, the current consumption can be reduced within a range in which the power supply noise is allowed. Note that, since the power consumption in the dummy drive circuit 120 is proportional to the current flowing through the dummy drive circuit 120, the current consumption reduction may be used as a term equivalent to the power consumption reduction.

Figure 2:
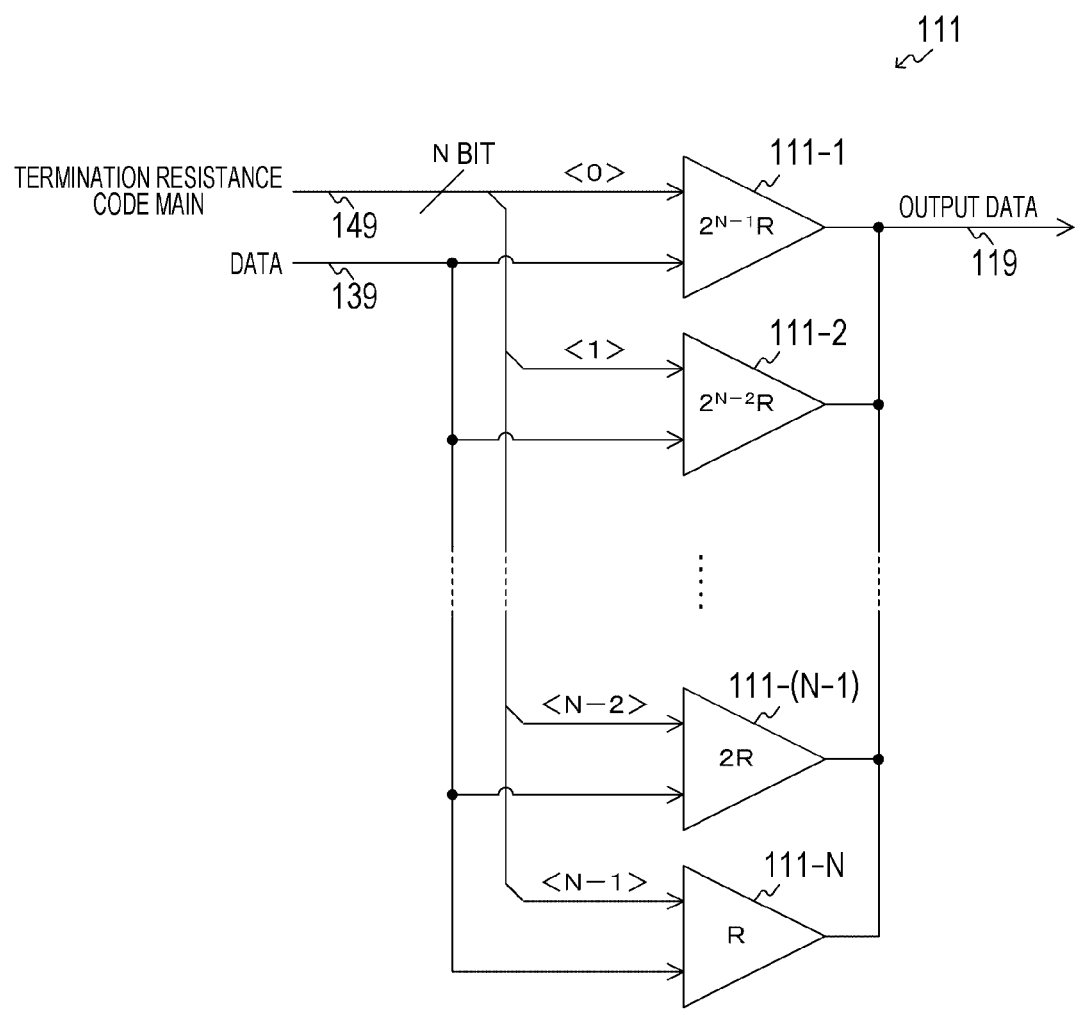
FIG. 2 is a diagram illustrating an example of a configuration of a driver 111 in the first embodiment of the present technology.

FIG. 2 is a diagram illustrating an example of a configuration of the driver 111 in the first embodiment of the present technology.

As described above, in the first embodiment, the main drive circuit 110 includes the plurality of drivers 111. Data is commonly supplied to each of the plurality of drivers 111 via the signal line 139.

In the drawing, it is assumed that N drivers 111 are provided, and the drivers may be referred to as the drivers 111-1, 111-2, . . . , 111-N, and the like when distinguished from each other. In this example, it is assumed that a resistance value of each of the drivers 111 is weighted by a binary number. That is, assuming that the resistance value of the driver 111-N is R, the resistance value of the driver 111-(N−1) is 2R, . . . , the resistance value of the driver 111-2 is $2^{(N-2)}R$, and the resistance value of the driver 111-1 is $2^{(N-1)}R$.

The termination resistance code main supplied from the operation state control circuit 140 via the signal line 149 includes N bits corresponding to the number N of the drivers 111, and each bit of this bit pattern is supplied to the driver 111 by 1 bit. Each bit of the termination resistance code main controls the operation state of the corresponding driver 111. For example, if the bit is "1", the driver 111 is controlled to operate, and if the bit is "0", the driver 111 is controlled not to operate. Therefore, the number of operating drivers 111 is controlled in accordance with the termination resistance code main, and the termination resistance obtained by combined resistance of the operating drivers 111 is adjusted.

As described above, since a resistance value of each of the drivers 111 is weighted by a binary number, the termination resistance code main is represented as a binary code. That is, the driver 111 of the main drive circuit 110 is controlled by a binary code.

Note that, although the example of the configuration of the main drive circuit 110 has been described here, the dummy drive circuit 120 similarly includes a plurality of drivers 121 and is controlled by a binary code. However, the dummy drive circuit 120 does not output data to be transmitted.

Operation State Control

Figure 3:
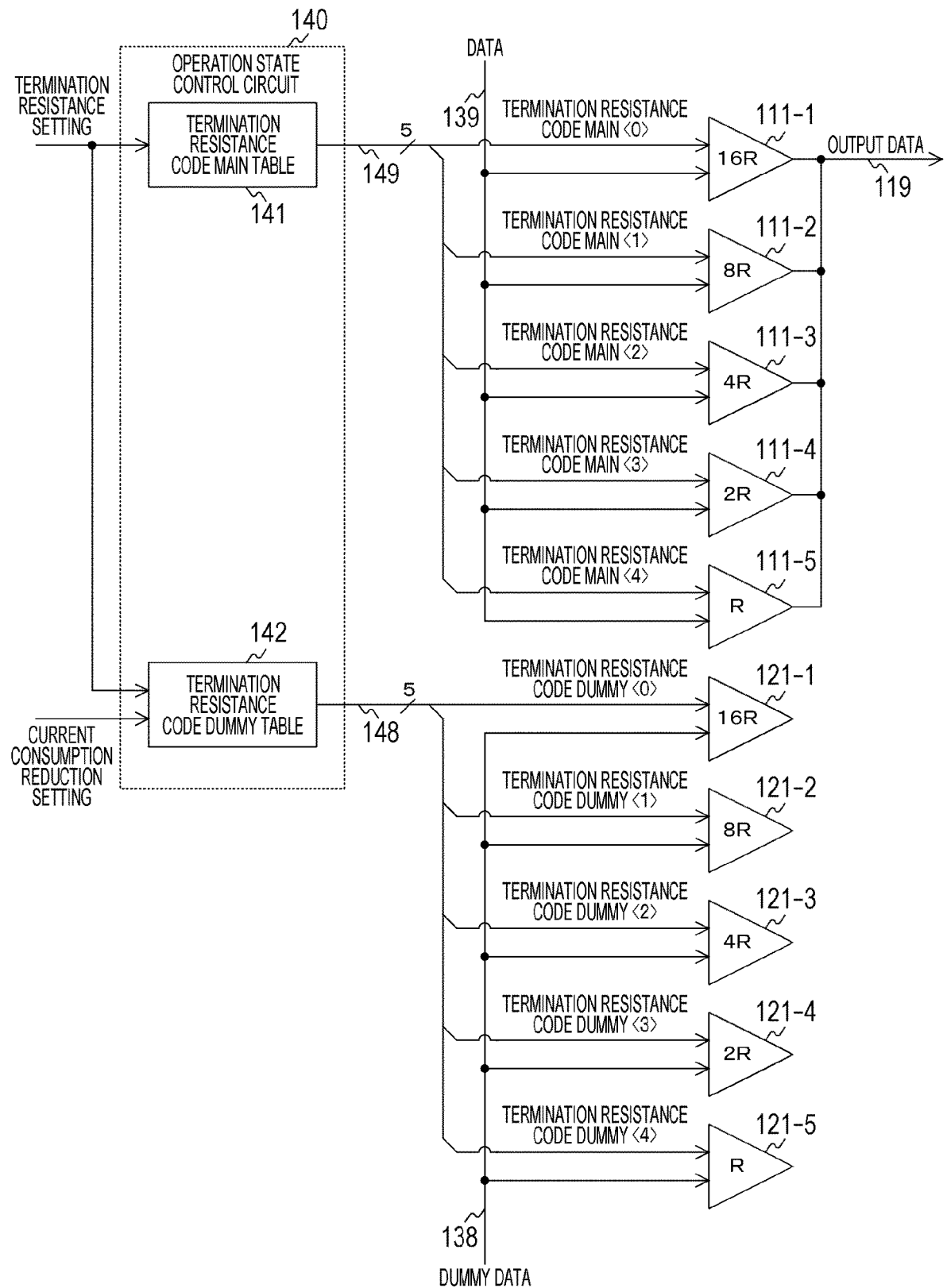
FIG. 3 is a diagram illustrating an example of operation state control by an operation state control circuit 140 in the first embodiment of the present technology.

FIG. 3 is a diagram illustrating an example of operation state control by the operation state control circuit 140 in the first embodiment of the present technology.

In this example, it is assumed that five drivers 111 and five drivers 121 are provided. As described above, the resistance value of each of the drivers 111 is weighted by a binary number, and assuming that the resistance value of the driver 111-5 is R, the resistance value of the driver 111-4 is represented as 2R, the resistance value of the driver 111-3 is represented as 4R, the resistance value of the driver 111-2 is represented as 8R, and the resistance value of the driver 111-1 is represented as 16R. Furthermore, similarly in the driver 121, the resistance value of the driver 121-5 is represented as R, the resistance value of the driver 121-4 is represented as 2R, the resistance value of the driver 121-3 is represented as 4R, the resistance value of the driver 121-2 is represented as 8R, and the resistance value of the driver 121-1 is represented as 16R. Then, the operation states of the driver 111 and the driver 121 are controlled by the termination resistance code main and the termination resistance code dummy of 5 bits, respectively, from the operation state control circuit 140.

The operation state control circuit 140 includes a termination resistance code main table 141 and a termination resistance code dummy table 142. The operation state control circuit 140 refers to the termination resistance code main table 141 and outputs the corresponding termination resistance code main depending on the setting of the termination resistance. Furthermore, the operation state control circuit 140 refers to the termination resistance code dummy table 142 and outputs the corresponding termination resistance code dummy depending on the setting of the termination resistance and the setting of the current consumption reduction.

FIG. 4 is a diagram illustrating an example of the termination resistance code main table 141 in the first embodiment of the present technology.

The termination resistance code main table 141 is a table that holds the termination resistance code main corresponding to a termination resistance value (Q) of the main drive circuit 110. The operation state control circuit 140 reads from the termination resistance code main table 141 the termination resistance code main corresponding to the termination resistance value equivalent to the input termination resistance setting. The read 5-bit termination resistance code main is supplied to each corresponding one of the five drivers 111 by 1 bit, and is used to control the operation state of the driver 111.

The termination resistance of the main drive circuit 110 may change from a design value due to variations in a semiconductor process to be used. Therefore, the plurality of drivers 111 is prepared in the main drive circuit 110, and the termination resistance is adjusted by controlling the number of operating drivers 111 by the termination resistance code main.

FIG. 5 is a diagram illustrating an example of the termination resistance code dummy table 142 in the first embodiment of the present technology.

The termination resistance code dummy table 142 is a table that holds the termination resistance code dummy corresponding to a termination resistance value (2) of the dummy drive circuit 120. The termination resistance code dummy table 142 holds three types of termination resistance code dummy as an example. The first termination resistance code dummy is similar to that of the termination resistance code main table 141. The second termination resistance code dummy is obtained by shifting a bit pattern of the first termination resistance code dummy to the right by 1 bit. The third termination resistance code dummy is obtained by further shifting a bit pattern of the second termination resistance code dummy to the right by 1 bit. As the bit pattern of the termination resistance code dummy is bit-shifted to the right, the termination resistance value increases, so that the current consumed is reduced.

The operation state control circuit 140 reads from the termination resistance code dummy table 142 the termination resistance code main corresponding to the termination resistance value equivalent to the input termination resistance setting and the current consumption reduction setting. The read 5-bit termination resistance code dummy is supplied to each corresponding one of the five drivers 121 by 1 bit, and is used to control the operation state of the driver 121.

The dummy drive circuit 120 is a dummy for reducing a power supply noise of the main drive circuit 110, and does not directly output data to be transmitted. Therefore, by controlling the operation state of the driver 121, the current consumption of the dummy drive circuit 120 can be reduced independently of the main drive circuit 110. Note that, since the power supply noise increases as the number of operating drivers 121 decreases, it is necessary to perform the current consumption reduction setting so as to satisfy the allowable level of the power supply noise.

In this example, it is assumed that the termination resistance code is read from the termination resistance code main table 141 and the termination resistance code dummy table 142, but the method of setting the termination resistance code is not limited thereto. For example, the termination resistance code may be set from the outside by an interface such as an inter-integrated circuit (I2C) or an improved inter-integrated circuit (I3C). Furthermore, a calculation formula of the termination resistance code may be implemented by hardware.

[Operation Timing]

Figure 6:
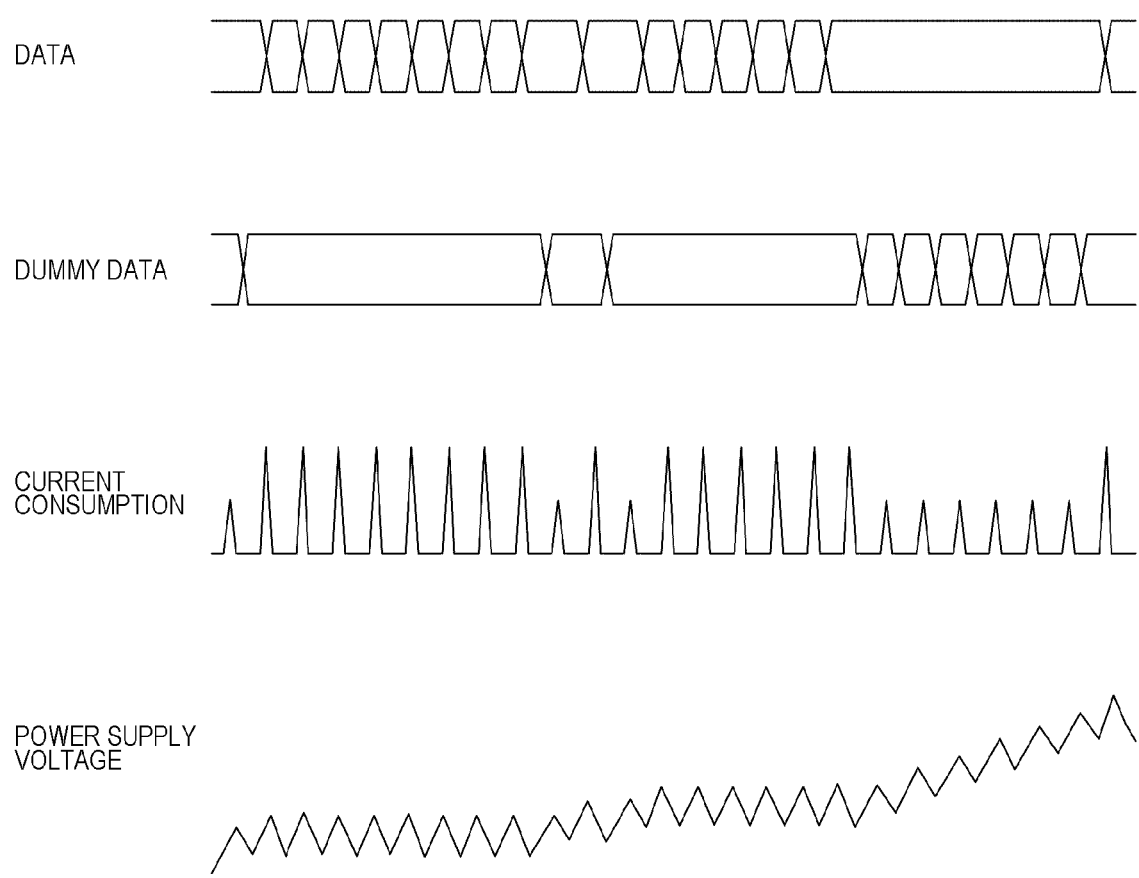
FIG. 6 is a diagram illustrating an example of an operation timing by the operation state control circuit 140 in the first embodiment of the present technology.

FIG. 6 is a diagram illustrating an example of an operation timing by the operation state control circuit 140 in the first embodiment of the present technology.

The data generation circuit 130 supplies input parallel data as "data" of a serial signal, and supplies "dummy data" that transitions at a timing when the serialized "data" does not transition. Since the main drive circuit 110 drives "data" and the dummy drive circuit 120 drives "dummy data", current flows at a transition timing of each of the "data" and the "dummy data".

In the first embodiment, since the number of operating drivers 121 in the dummy drive circuit 120 can be controlled by the current consumption reduction setting, the "current consumption" at the timing when the "data" does not transition can be reduced. In a case where the number of operating drivers 121 is reduced, the power supply noise of a "power supply voltage" may increase without being canceled completely, but the current consumption reduction setting for the operation state control circuit 140 allows the power supply noise to be preset to satisfy an allowable power supply noise level.

As described above, according to the first embodiment of the present technology, since the number of operating drivers 121 in the dummy drive circuit 120 can be independently controlled, power consumption can be reduced in accordance with a required jitter characteristic. An interface often covers from a low data rate to a high data rate. Therefore, by enabling to change the amount of bit shift in accordance with the data rate, such as prioritizing a jitter characteristic at a high data rate and prioritizing power consumption at a low data rate, it is possible to prevent excessive design and realize low power consumption.

Since the main drive circuit 110 needs to adjust the termination resistance to, for example, 50Ω or the like in order to perform data transmission, the number of operating drivers 111 cannot be changed for the purpose of power reduction. On the other hand, the dummy drive circuit 120 does not need to perform data transmission, and even if the number of operating drivers 121 is changed, it only affects a cancellation amount of the power supply noise. Therefore, by reducing the number of operating drivers 121 only in the dummy drive circuit 120, it is possible to realize low power consumption while improving the jitter characteristic as compared with the state without noise cancellation.

Modification

In the first embodiment described above, the bit shift is realized by reading the termination resistance code dummy from the termination resistance code dummy table 142, but the implementation example of the bit shift is not limited thereto. Here, an example of implementing the bit shift by providing a switch will be described.

Figure 7:
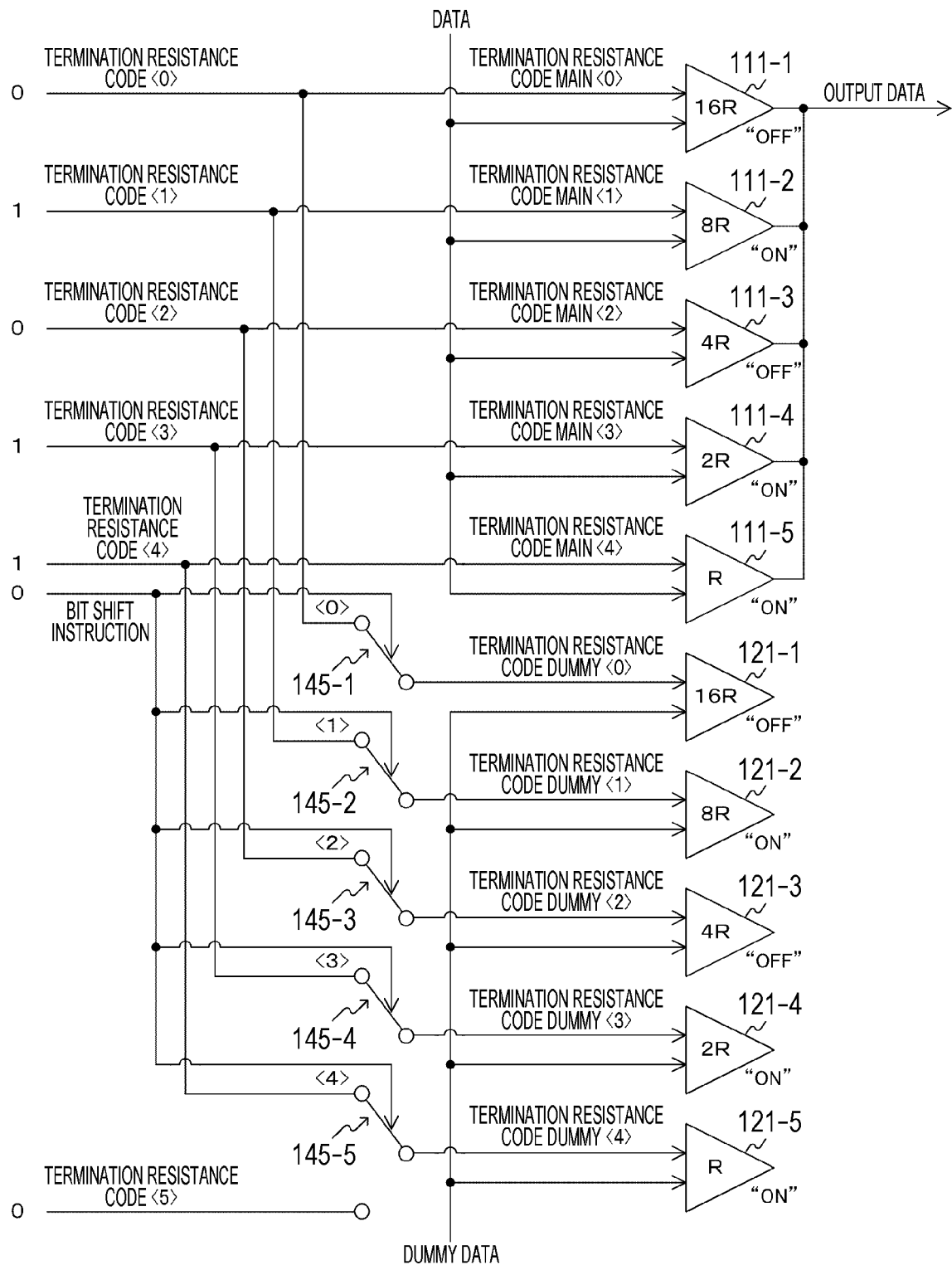
FIG. 7 is a diagram illustrating an example of operation state control (no bit shift) by the operation state control circuit 140 in a modification of the first embodiment of the present technology.
Figure 8:
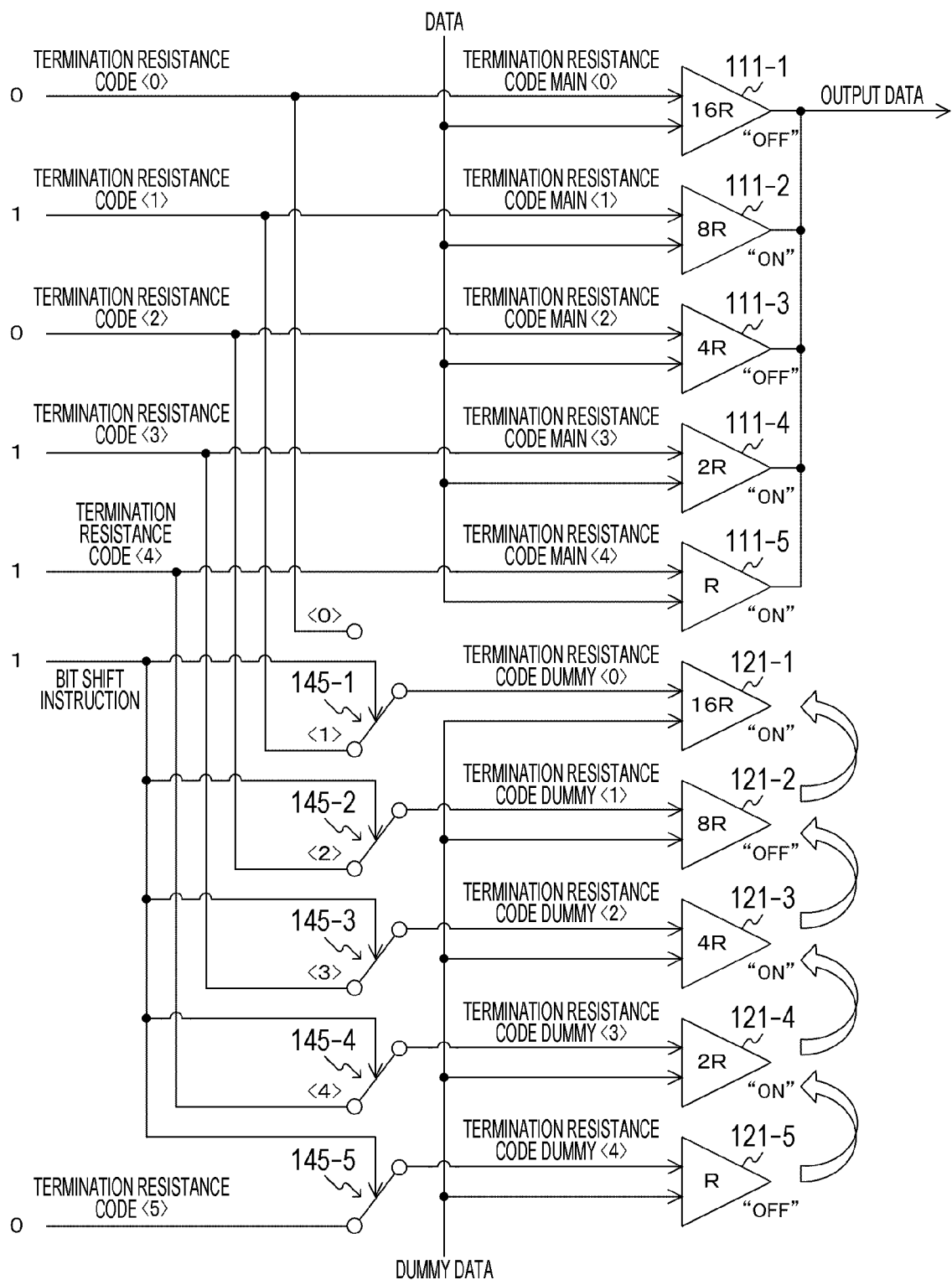
FIG. 8 is a diagram illustrating an example of operation state control (1-bit shift) by the operation state control circuit 140 in the modification of the first embodiment of the present technology.

FIGS. 7 and 8 are diagrams each illustrating an example of operation state control by the operation state control circuit 140 in a modification of the first embodiment of the present technology.

In this modification, the bit shift is performed by providing a switch 145 on an input side of the driver 121. The switch 145 is connected to one input of each driver 121, and is referred to as a switch 145-1, 145-2, . . . , 145-N, or the like when distinguished from each other.

In accordance with a bit shift instruction, the switch 145-1 selects one of the termination resistance codes <0> and <1> and supplies the selected termination resistance code to one input of the driver 121-1. In accordance with the bit shift instruction, the switch 145-2 selects one of the termination resistance codes <1> and <2> and supplies the selected termination resistance code to one input of the driver 121-2. In accordance with the bit shift instruction, the switch 145-3 selects one of the termination resistance codes <2> and <3> and supplies the selected termination resistance code to one input of the driver 121-3. In accordance with the bit shift instruction, the switch 145-4 selects one of the termination resistance codes <3> and <4> and supplies the selected termination resistance code to one input of the driver 121-4. In accordance with the bit shift instruction, the switch 145-5 selects one of the termination resistance codes <4> and <5> and supplies the selected termination resistance code to one input of the driver 121-5.

The bit shift instruction input to the switch 145 is a control signal that instructs control of the bit shift. In this example, it is assumed that the presence or absence of the bit shift is instructed, but the number of bits to be bit-shifted may be instructed.

FIG. 7 illustrates an example of a case where the bit shift is not performed, and FIG. 8 illustrates an example of a case where a 1-bit shift is performed. That is, the operation similar to switching between "no bit shift" and "1-bit shift" in the termination resistance code dummy table 142 of the first embodiment described above is performed.

As described above, according to the modification of the first embodiment of the present technology, by switching the switch 145, the number of operating drivers 121 in the dummy drive circuit 120 is independently controlled, and power consumption can be reduced in accordance with a required jitter characteristic.

2. Second Embodiment

In the first embodiment described above, it is assumed that the driver 111 and the driver 121 are controlled by the binary code, but other code systems may be used as the termination resistance code. In the second embodiment, an example in which a thermometer code is used in a part of the driver 111 and the driver 121 will be described.

[Data Transmission Circuit]

Figure 9:
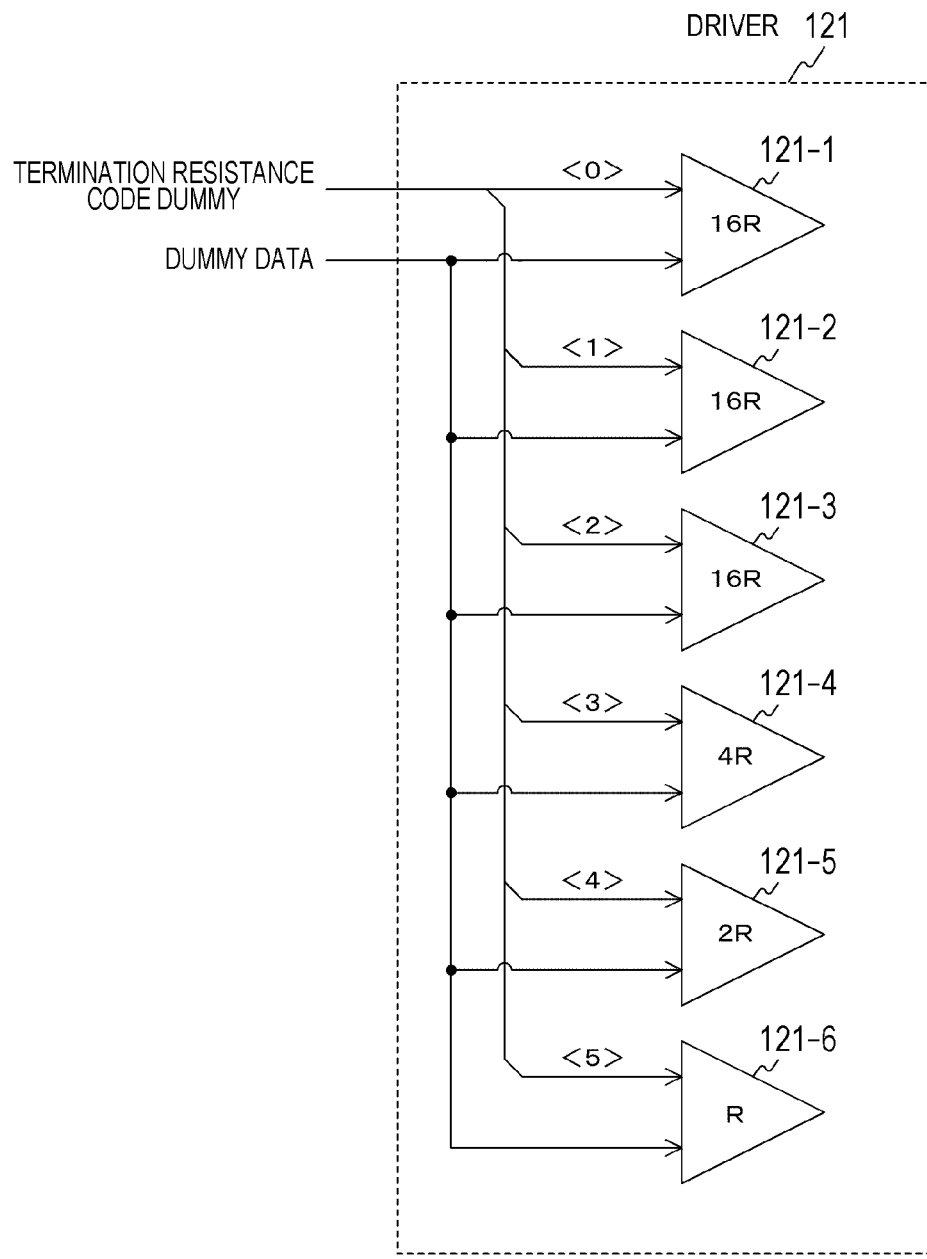
FIG. 9 is a diagram illustrating an example of a configuration of a driver 121 in a second embodiment of the present technology.

FIG. 9 is a diagram illustrating an example of a configuration of a driver 121 in the second embodiment of the present technology.

As an example, it is assumed that a dummy drive circuit 120 in the second embodiment includes six drivers 121, resistance values of the drivers 121-1 to 121-3 are equal to one another, and resistance values of the drivers 121-4 to 121-6 are weighted by binary numbers. For example, assuming that the resistance value of the driver 121-6 is R, the resistance value of the driver 121-5 is represented as 2R, the resistance value of the driver 121-4 is represented as 4R, and the resistance value of each of the drivers 121-1 to 121-3 is represented as 16R.

That is, the drivers 121-4 to 121-6 are controlled by the binary codes similarly to the first embodiment described above, but the drivers 121-1 to 121-3 are controlled by the thermometer codes. The thermometer code is a code represented by continuous 0 and continuous 1.

Note that, although the configuration example of the dummy drive circuit 120 has been described here, a main drive circuit 110 similarly includes a plurality of drivers 111 and is controlled by the binary codes and the thermometer codes.

FIG. 10 is a diagram illustrating an example of control by the thermometer code in the second embodiment of the present technology.

In this example, an example of relationships between the lower 3 bits of a termination resistance code dummy and the operation states of the drivers 121-1 to 121-3 is illustrated. That is, when the termination resistance code dummy <0> is "0", the driver 121-1 does not operate, and when the termination resistance code dummy <0> is "1", the driver 121-1 operates. When the termination resistance code dummy <1> is "0", the driver 121-2 does not operate, and when the termination resistance code dummy <1> is "1", the driver 121-2 operates. When the termination resistance code dummy <2> is "0", the driver 121-3 does not operate, and when the termination resistance code dummy <2> is "1", the driver 121-3 operates. That is, as the value of the termination resistance code dummy increases, the number of operating drivers 121 increases one by one.

As described above, according to the second embodiment of the present technology, by using the thermometer code in a lower bit portion on an LSB side of the termination resistance code dummy, it is possible to ensure linearity (differential non-linearity (DNL)) of the termination resistance.

In this example, the case where the resistance values of some of the drivers 121 are equal to one another has been described. However, the resistance values of all the drivers 121 may be made equal to one another, and the whole may be controlled by the thermometer codes. Note that, in this case, the number of drivers 121 may increase and an occupied area may also increase as compared with the case of binary weighting.

In the second embodiment, similarly to the first embodiment described above, the bit shift of the termination resistance code can be realized by using the termination resistance code main table 141 and the termination resistance code dummy table 142. Furthermore, as described below, the bit shift may be realized by providing a switch similarly to the modification of the first embodiment described above.

Figure 11:
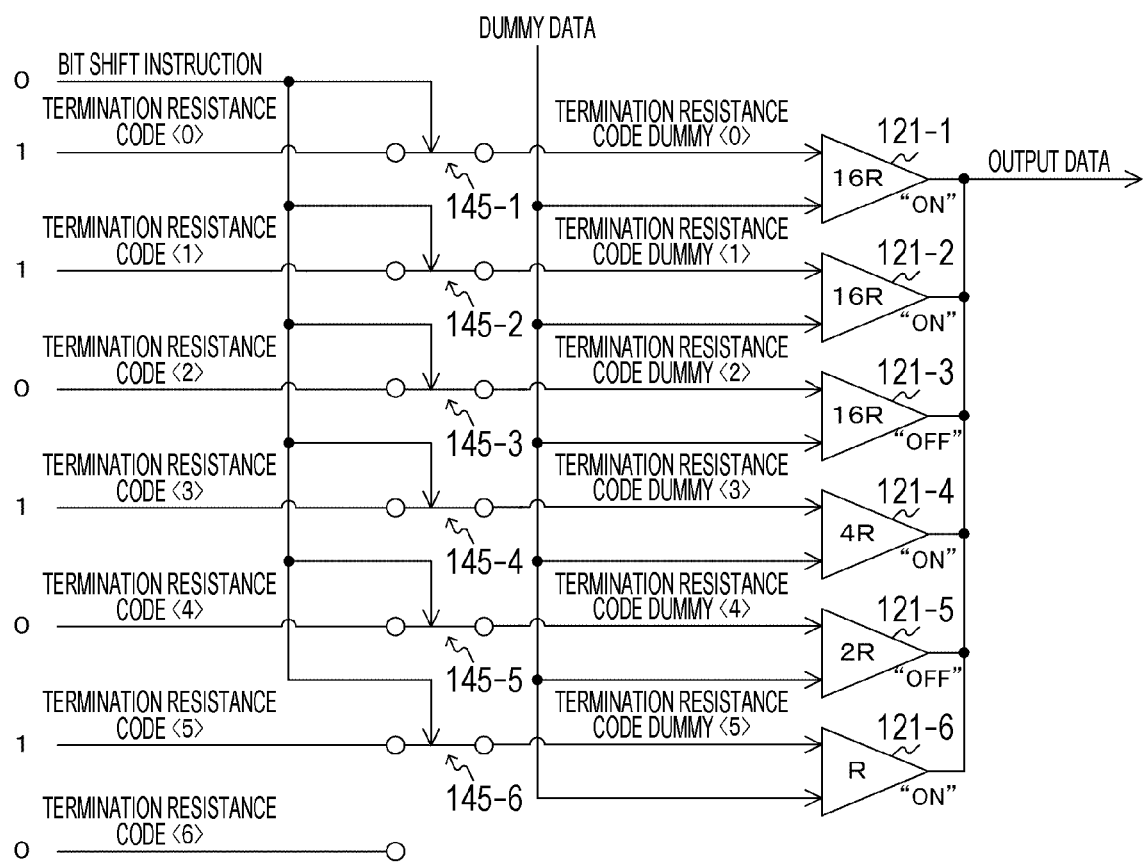
FIG. 11 is a diagram illustrating an example of operation state control (no bit shift) by an operation state control circuit 140 in the second embodiment of the present technology.
Figure 12:
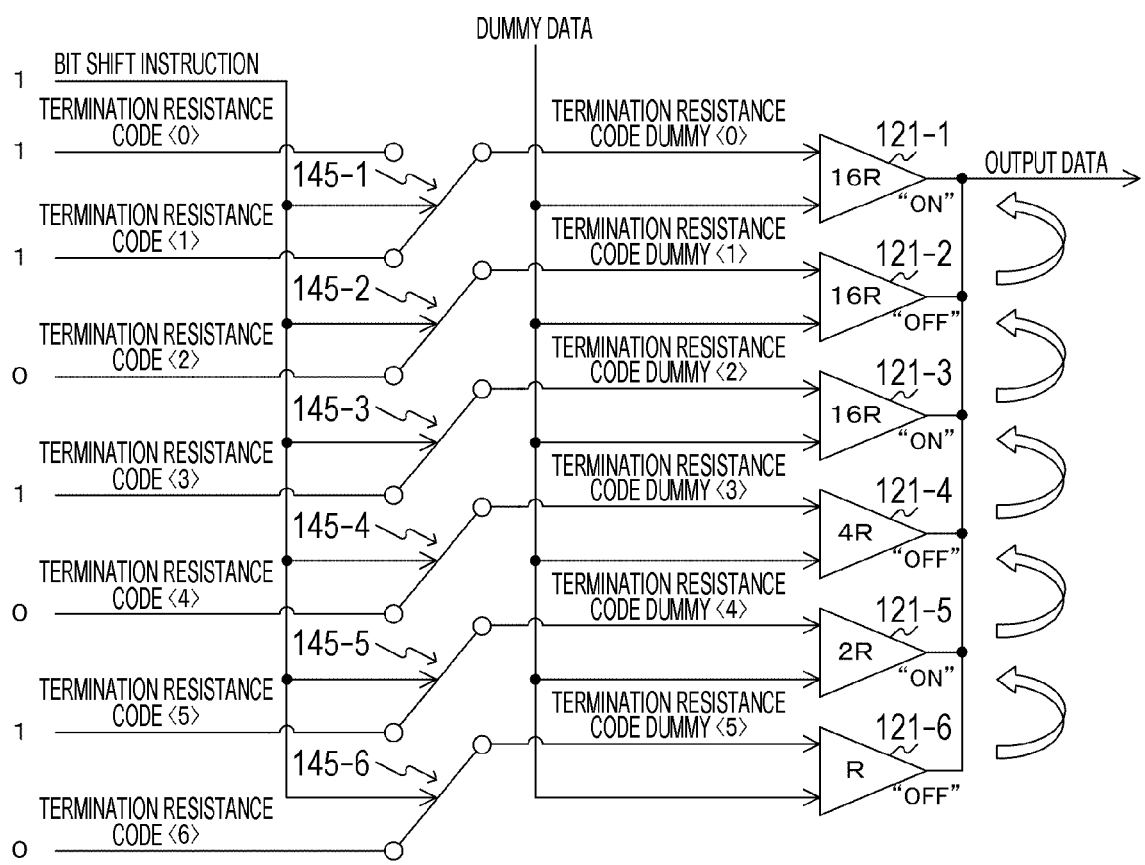
FIG. 12 is a diagram illustrating an example of operation state control (1-bit shift) by the operation state control circuit 140 in the second embodiment of the present technology.

FIGS. 11 and 12 are diagrams each illustrating an example of operation state control by an operation state control circuit 140 in the second embodiment of the present technology.

In this example, the bit shift is performed by providing a switch 145 on an input side of the driver 121 similarly to the modification of the first embodiment described above. FIG. 11 illustrates an example of a case where the bit shift is not performed, and FIG. 12 illustrates an example of a case where a 1-bit shift is performed.

Modification

In the case where the thermometer code is used as in the second embodiment described above, the linearity of the termination resistance can be secured, but there may be a possibility that reduction efficiency of the current consumption is insufficient. On the other hand, it is assumed that a constant current reduction rate is realized in a wide range of the termination resistance codes by changing the number of bit shifts in accordance with the termination resistance code.

Figure 13:
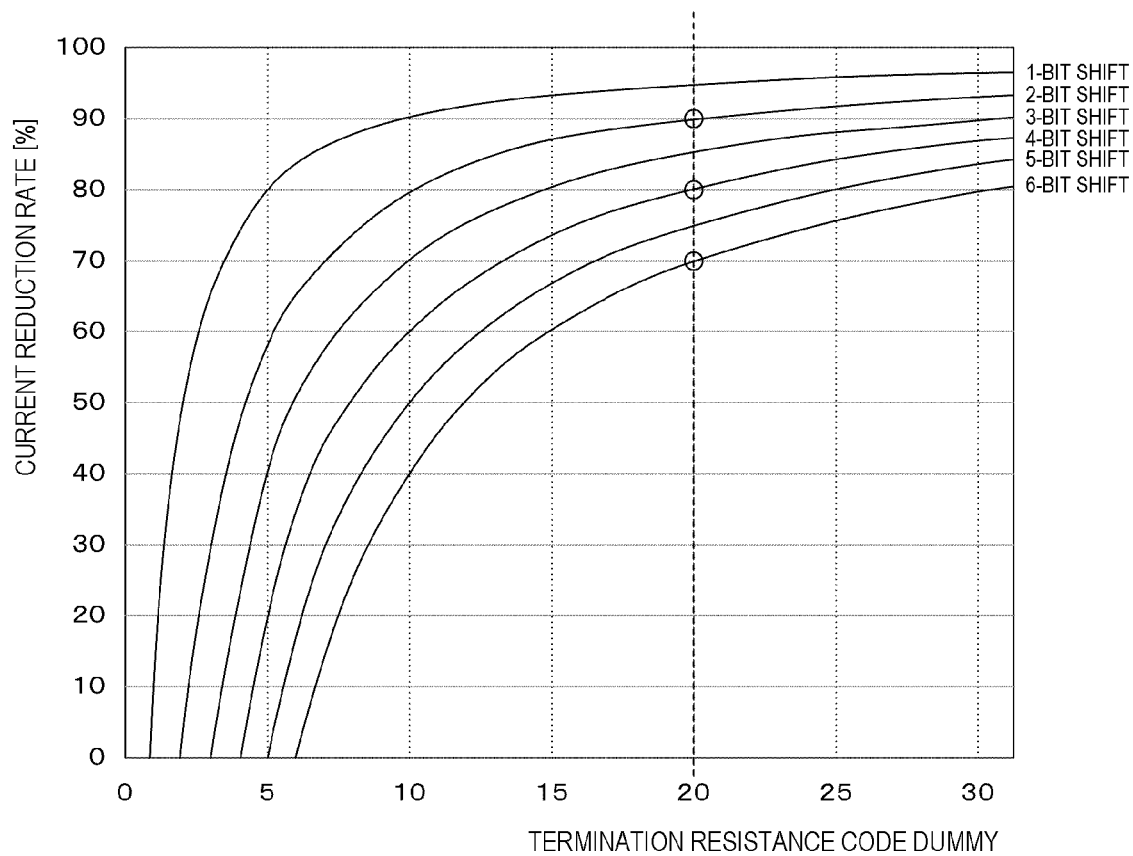
FIG. 13 is a diagram illustrating an example of a correspondence relationship between a termination resistance code dummy and a current reduction rate in the second embodiment of the present technology.

FIG. 13 is a diagram illustrating an example of a correspondence relationship between a termination resistance code dummy and a current reduction rate in the second embodiment of the present technology.

Here, the current reduction rate indicates a reduction rate (%) of the current consumption in the case where the bit shift is performed with respect to the current consumption in the case where the bit shift is not performed. According to this relationship example, it can be seen that when the termination resistance code dummy is "20", a 2-bit shift is only required if the desired current reduction rate is "90%", a 4-bit shift is only required if the desired current reduction rate is "80%", and a 6-bit shift is only required if the desired current reduction rate is "70%".

Figure 14:
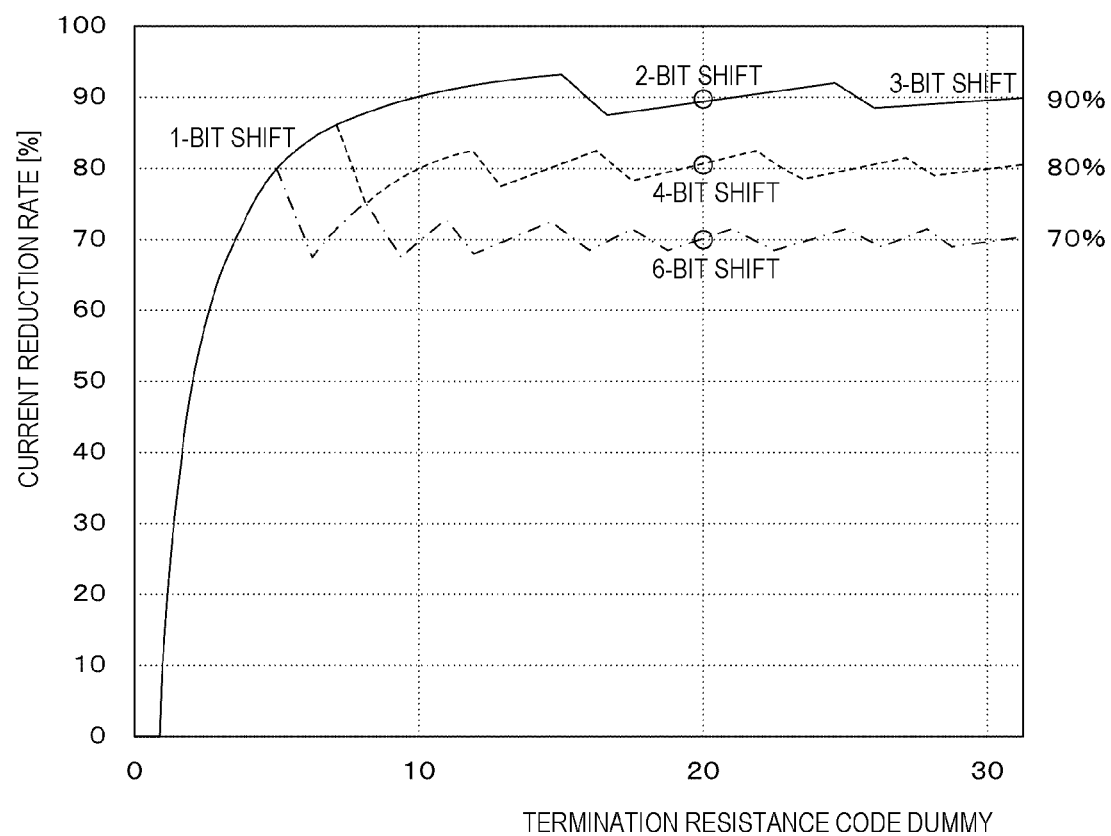
FIG. 14 is a diagram illustrating an example of the current reduction rate in a case where the number of bit shifts is changed in accordance with the termination resistance code dummy in the second embodiment of the present technology.

FIG. 14 is a diagram illustrating an example of a current reduction rate in a case where the number of bit shifts is changed in accordance with the termination resistance code dummy in the second embodiment of the present technology.

As illustrated in this diagram, it is possible to realize a current reduction rate which is constant to some extent by increasing the number of bit shifts as the termination resistance code dummy increases. For example, when the desired current reduction rate is "90%", a 1-bit shift is selected until the termination resistance code dummy becomes about "15", a 2-bit shift is selected until the termination resistance code dummy becomes about "24", and a 3-bit shift is selected when the termination resistance code dummy exceeds "24".

Furthermore, when the desired current reduction rate is "80%", a 1-bit shift is selected until the termination resistance code dummy becomes about "8", a 2-bit shift is selected until the termination resistance code dummy becomes about "12", a 3-bit shift is selected until the termination resistance code dummy becomes about "17", a 4-bit shift is selected until the termination resistance code dummy becomes about "22", and a 5-bit shift is selected until the termination resistance code dummy becomes about "27".

Similarly, when the desired current reduction rate is "70%", a 1-bit shift is selected until the termination resistance code dummy becomes about "5", a 2-bit shift is selected until the termination resistance code dummy becomes about "8", a 3-bit shift is selected until the termination resistance code dummy becomes about "11", a 4-bit shift is selected until the termination resistance code dummy becomes about "15", a 5-bit shift is selected until the termination resistance code dummy becomes about "18", a 6-bit shift is selected until the termination resistance code dummy becomes about "21", and a 7-bit shift is selected until the termination resistance code dummy becomes about "25", for example.

As described above, according to the modification of the second embodiment of the present technology, by appropriately changing the number of bit shifts for each termination resistance code dummy, it is possible to realize certain current reduction for the termination resistance code dummy even in a case where control is performed by the thermometer code.

3. Third Embodiment

In the first embodiment described above, the number of bit shifts of an integer value is assumed, but the number of bit shifts may be a decimal. In the third embodiment, an implementation example in which the number of bit shifts is a decimal will be described. By setting the termination resistance code dummy such that the termination resistance code dummy is smaller than the termination resistance code main, it is possible to realize the decimal bit shift without changing the configuration of the number of drivers 121. Furthermore, it is also possible to realize a decimal bit shift by adding the driver 121 having a smaller resistance value.

[Decimal Bit Shift]

Figure 15:
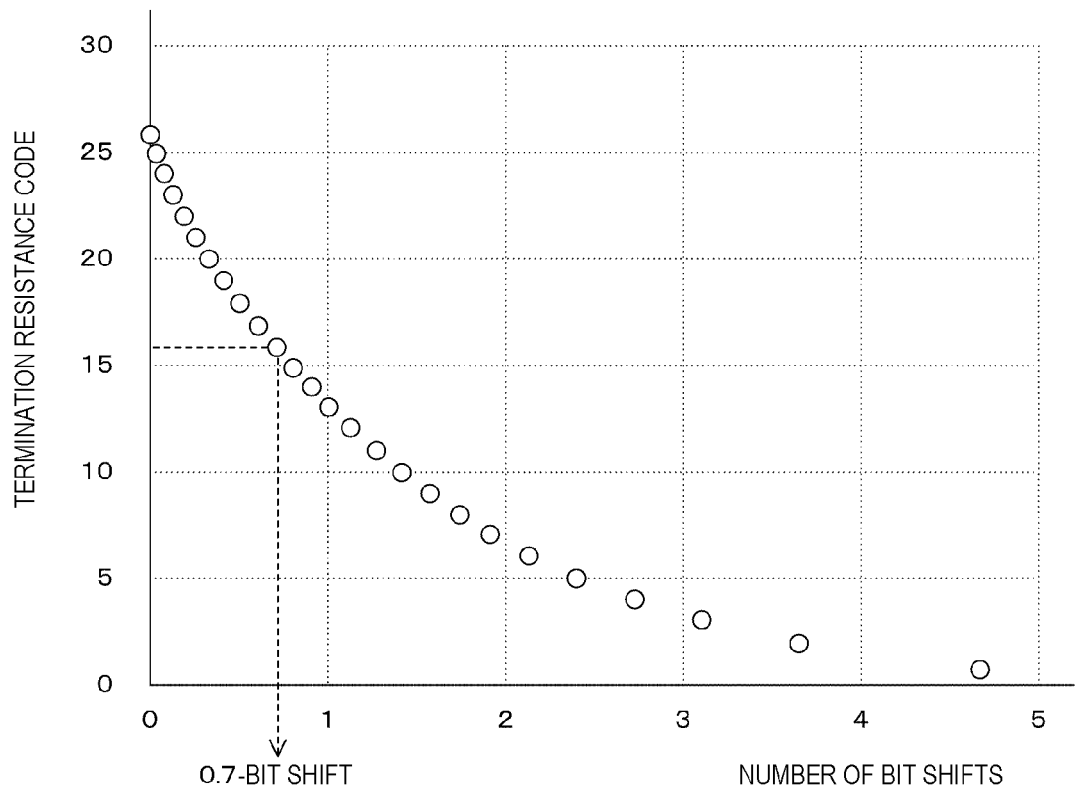
FIG. 15 is a diagram illustrating an example of a relationship between the number of bit shifts and a termination resistance code in a third embodiment of the present technology.

FIG. 15 is a diagram illustrating an example of a relationship between the number of bit shifts and the termination resistance code in the third embodiment of the present technology.

In this example, a case where the termination resistance code main is "26" is assumed. In this case, the termination resistance code dummy shifted by 1 bit is "13". Then, when the termination resistance code dummy is set to "16", a termination resistance equivalent to about a 0.7-bit shift can be realized.

When this is expressed by a formula, the number of bit shifts x is obtained by the following formula.

$$x = \log_{1/2}(\text{termination resistance code dummy} / \text{termination resistance code main})$$

In the above formula, when the termination resistance code dummy is "13", the number of bit shifts x is obtained by the following formula.

$$x = \log_{1/2}(13/26) = 1 (\text{bit shift})$$

Furthermore, when the termination resistance code dummy is "16", the number of bit shifts x is obtained by the following formula.

$$x = \log_{1/2}(16/26) = 0.7044 (\text{bit shift})$$

[Operation State Control]

Figure 16A:
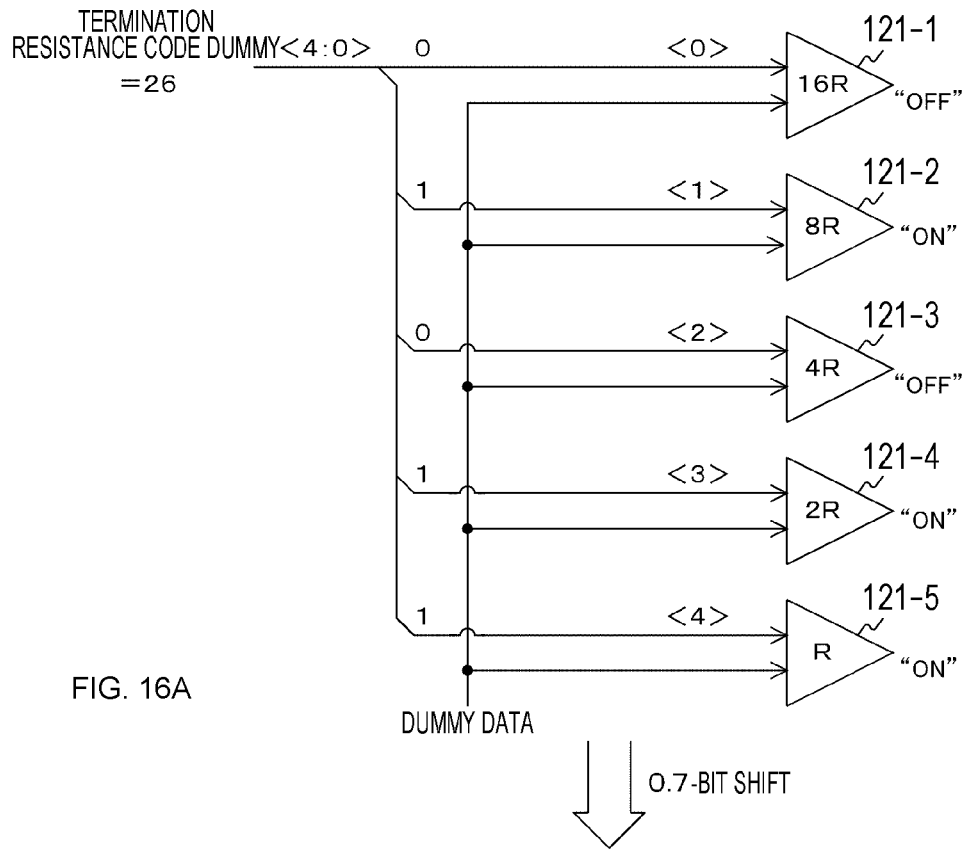
FIGS. 16A and 16B are diagrams illustrating an example of operation state control by an operation state control circuit 140 in the third embodiment of the present technology.
Figure 16B:
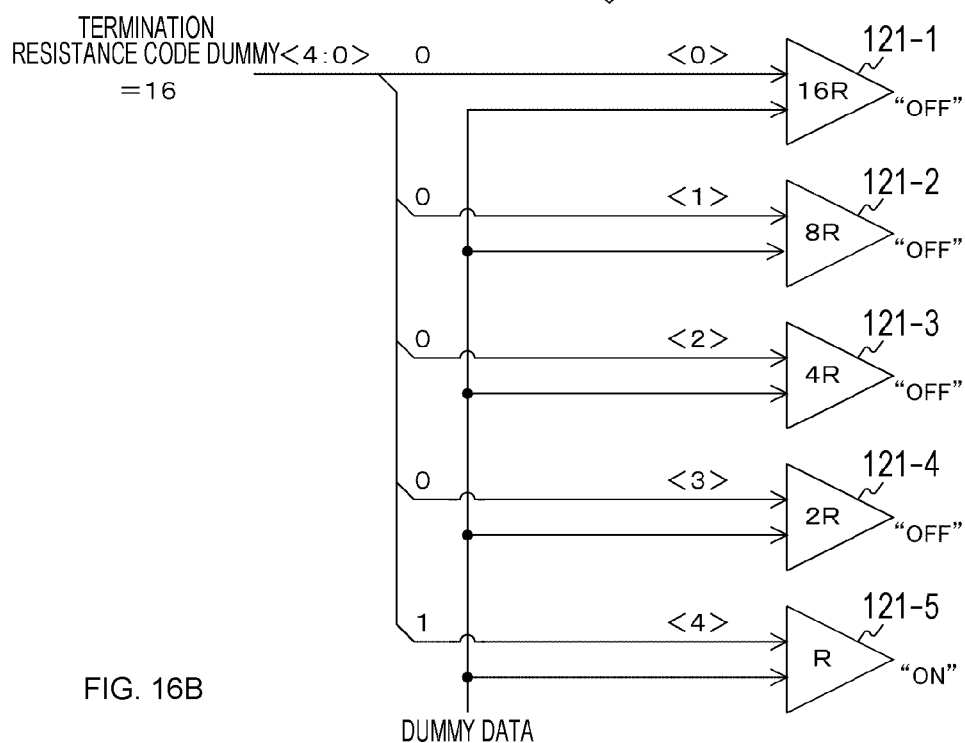

FIGS. 16A and 16B are diagrams illustrating an example of operation state control by an operation state control circuit 140 in the third embodiment of the present technology.

As illustrated in FIG. 16A of the drawing, in a case where the termination resistance code main is "26", the termination resistance code dummy is "26" without change when the bit shift is not performed. Furthermore, as illustrated in FIG. 16B of the drawing, in order to realize a 0.7-bit shift, the termination resistance code dummy of "16" is only required.

As described above, according to the third embodiment of the present technology, it is possible to realize the decimal bit shift of the termination resistance code.

4. Fourth Embodiment

In the first embodiment described above, one stage is assumed as the number of stages of the drivers 111 and 121 of the main drive circuit 110 and the dummy drive circuit 120, respectively, but these may be a plurality of stages.

In a case where the drivers 111 and 121 are configured in a plurality of stages, since a load when viewed from the preceding stage looks large, the drivers are multistage-connected in series so that the load gradually increases. In this case, the operation state control according to the above-described embodiments can be applied to any stage of the drivers 111 and 121 multistage-connected in series.

Figure 17:
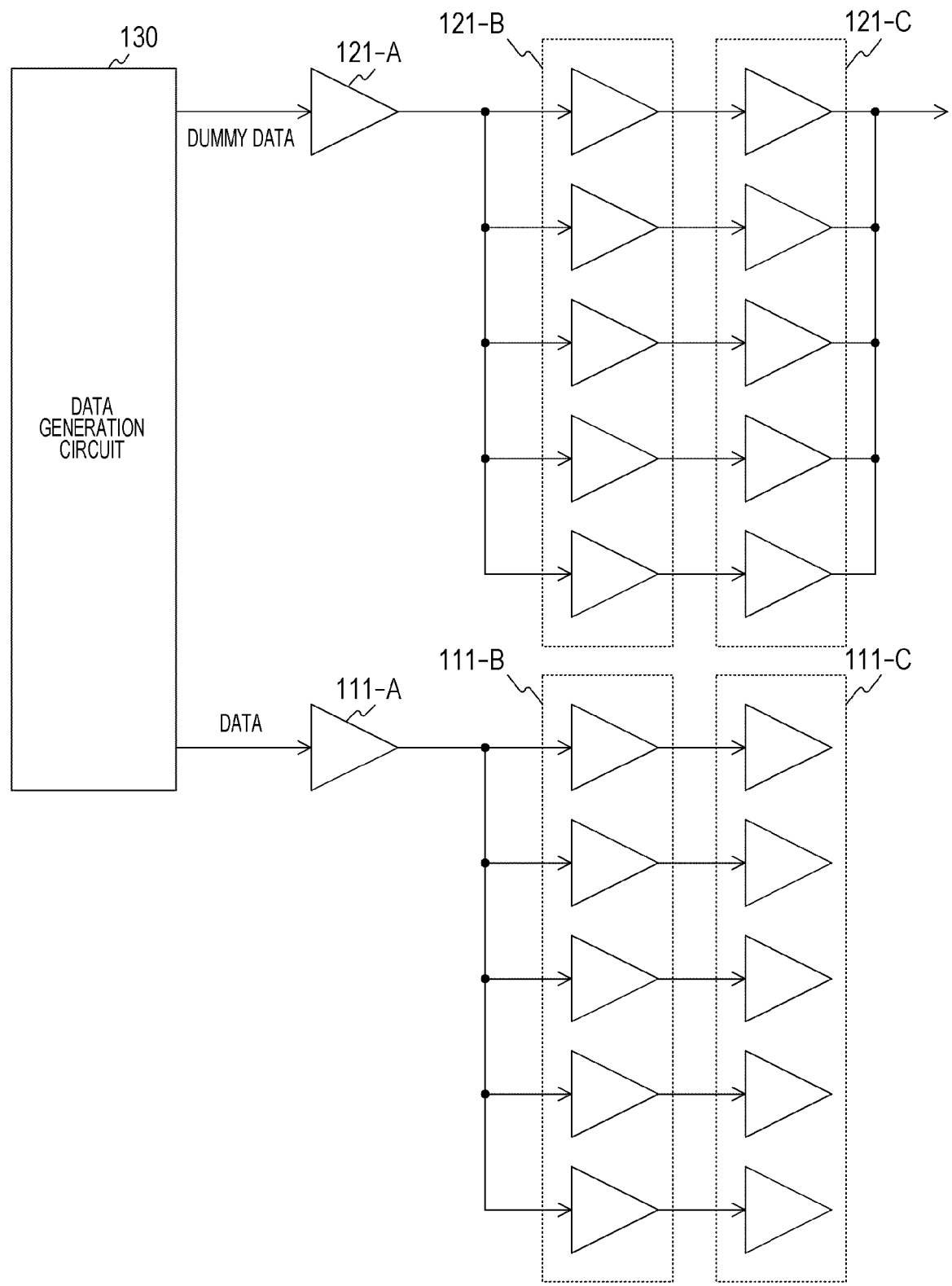
FIG. 17 is a diagram illustrating an example of a configuration of a main drive circuit 110 and a dummy drive circuit 120 in a fourth embodiment of the present technology.

FIG. 17 is a diagram illustrating an example of a configuration of a main drive circuit 110 and a dummy drive circuit 120 in the fourth embodiment of the present technology.

In this example, the main drive circuit 110 and the dummy drive circuit 120 include three-stage drivers 111-A to 111-C and 121-A to 121-C, respectively. In this case, either the bit shift of only the driver 121-B, the bit shift of only the driver 121-C, or the bit shift of the drivers 121-B and 121-C may be applied.

As described above, according to the fourth embodiment of the present technology, in a case where the drivers 111 and 121 are configured in a plurality of stages, the operation state control according to the above-described embodiments can be applied in an arbitrary stage.

5. Fifth Embodiment

In the first embodiment described above, the current consumption of the dummy drive circuit 120 is controlled by changing the number of operating drivers 121, but the current consumption control of the dummy drive circuit 120 is not limited thereto. In the fifth embodiment, current consumption of a dummy drive circuit 120 is controlled by changing an amount flowing through a current source.

[Data Transmission Circuit]

Figure 18:
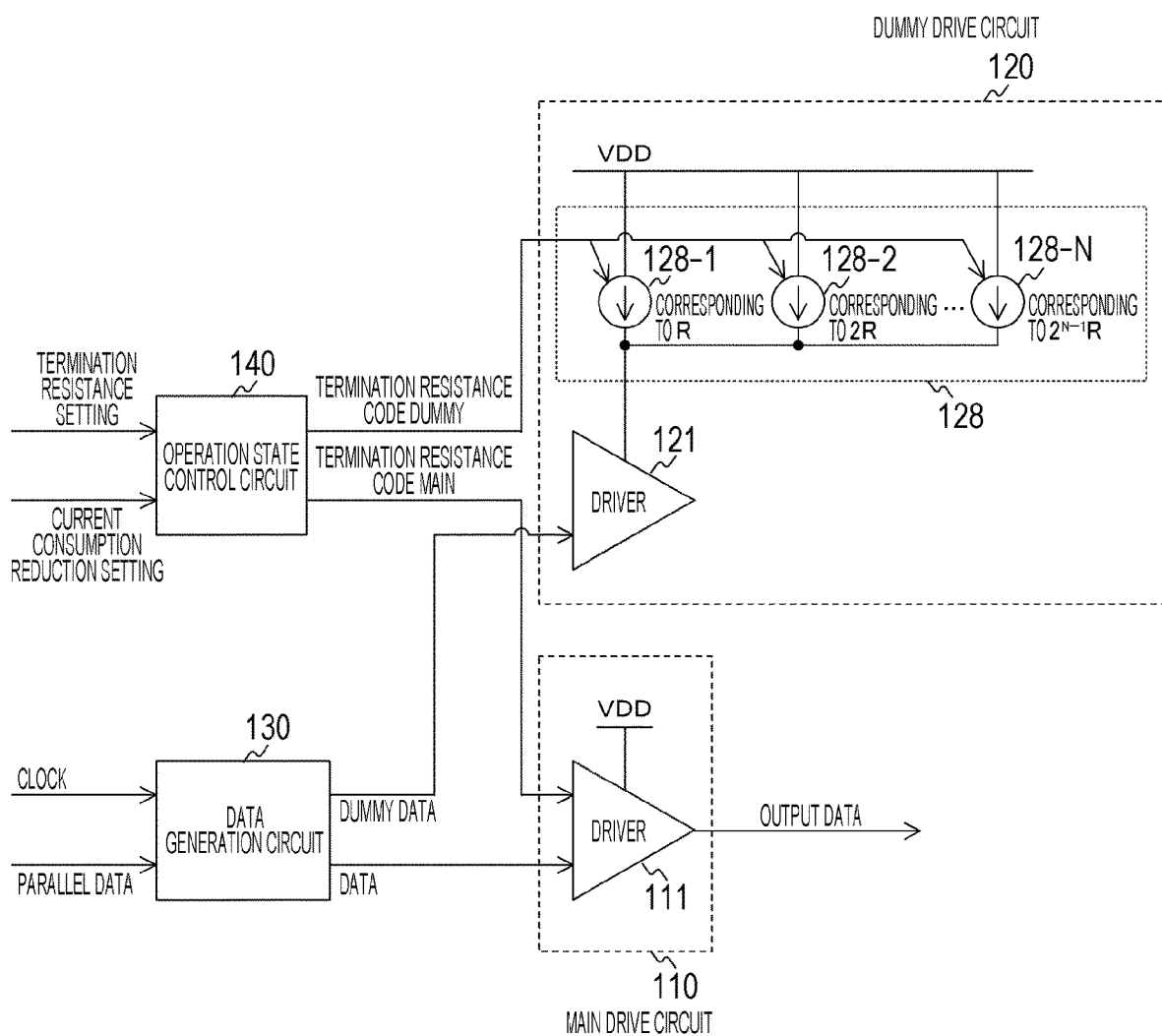
FIG. 18 is a diagram illustrating an example of a configuration of a data transmission circuit in a fifth embodiment of the present technology.

FIG. 18 is a diagram illustrating an example of a configuration of a data transmission circuit in the fifth embodiment of the present technology.

The data transmission circuit in the fifth embodiment includes, similarly to the first embodiment described above, a main drive circuit 110, a dummy drive circuit 120, a data generation circuit 130, and an operation state control circuit 140.

In the fifth embodiment, the dummy drive circuit 120 includes a driver 121 and a current source 128. The current source 128 is inserted between a power supply (VDD) or a ground (GND) and the driver 121, and is configured to be able to adjust current. The number of current sources 128 is N, and each operation state is controlled by each bit of a termination resistance code dummy, and a value of the current flowing from the power supply is controlled.

The N current sources 128 each supply a current amount corresponding to a resistance value weighted by a binary number. That is, assuming that a current amount of a current source 128-1 corresponds to a resistance value R, a current source 128-2 corresponds to 2R, . . . , and a current source 128-N corresponds to $2^{(N-1)}$R.

Here, as long as the amounts of the current flowing through the driver 111 and the driver 121 are the same when the termination resistance code main and the termination resistance code dummy are equal to each other, the number of current sources 128 may be any number. Furthermore, as long as the amounts of the current flowing through the driver 111 and the driver 121 are the same when the termination resistance code main and the termination resistance code dummy are equal to each other, the current source 128 may have any configuration.

Furthermore, in order to cancel a noise in both the power supply and the ground, the current sources 128 are desirably provided with above and below the driver 121, but the current source 128 may be provided on either the power supply side or the ground side.

Furthermore, the current source 128 may have any configuration as long as the current amount can be adjusted using the termination resistance code dummy. That is, the termination resistance code dummy may be subjected to D/A conversion, and the current source 128 may be controlled by an analog signal. Furthermore, the number of parallel resistances may be controlled by the termination resistance code dummy instead of the current source 128.

As described above, according to the fifth embodiment of the present technology, since the number of current sources 128 that operate in accordance with the termination resistance code dummy can be controlled, power consumption can be reduced in accordance with a required jitter characteristic.

Note that the above-described embodiments illustrate examples for embodying the present technology, and matters in the embodiments and matters specifying the invention in the claims have correspondence relationships. Similarly, the matters specifying the invention in the claims and matters having the same names in the embodiments of the present technology have correspondence relationships. However, the present technology is not limited to the embodiments and can be embodied by making various modifications to the embodiments without departing from the gist thereof.

Note that, the advantageous effects described in the present specification are merely examples and are not limited. In addition, there may be other advantageous effects.

Note that the present technology can also take the following configurations.

(1) A data transmission circuit including:
a first drive circuit configured to drive first data that transitions or does not transition in synchronization with a clock signal;
a second drive circuit configured to drive second data that transitions at a timing when the first data does not transition in synchronization with the clock signal; and
an operation state control circuit configured to individually control operation states of the first and second drive circuits.

(2) The data transmission circuit according to (1), further including a data generation circuit configured to generate first serial data as the first data that transitions or does not transition in synchronization with the clock signal, by converting input parallel data, and configured to generate second serial data as the second data that transitions at the timing when the first data does not transition in synchronization with the clock signal.

(3) The data transmission circuit according to (1) or (2), in which
the second drive circuit includes a plurality of drivers, and
the operation state control circuit controls the operation state of the second drive circuit by controlling the number of operating drivers among the plurality of drivers of the second drive circuit.

(4) The data transmission circuit according to (3), in which
the first drive circuit includes a plurality of drivers,
the operation state control circuit generates a first control signal that indicates presence or absence of operation for each of the plurality of drivers of the first drive circuit by a bit pattern and a second control signal that indicates presence or absence of operation for each of the plurality of drivers of the second drive circuit by a bit pattern, and
the second control signal is obtained by bit-shifting at least a part of the bit pattern of the first control signal in a predetermined direction.

(5) The data transmission circuit according to (4), in which
a shift amount of the bit shift in the second control signal is represented by an integer value.

(6) The data transmission circuit according to (4), in which
a shift amount of the bit shift in the second control signal is represented by a decimal value different from an integer.

(7) The data transmission circuit according to any one of (4) to (6), in which
the operation state control circuit generates the second control signal in accordance with a desired termination resistance by the plurality of drivers of the second drive circuit.

(8) The data transmission circuit according to (7), in which
the operation state control circuit generates the second control signal on the basis of desired current consumption in the plurality of drivers of the second drive circuit.

(9) The data transmission circuit according to any one of (4) to (8), in which the second drive circuit includes, in at least one stage, a driver group including a plurality of drivers multistage-connected in series, and the second control signal is obtained by bit-shifting at least a part of a corresponding bit pattern of the first control signal in a predetermined direction for the plurality of drivers in an arbitrary stage of the second drive circuit.

(10) The data transmission circuit according to any one of (3) to (9), in which in the plurality of drivers of the second drive circuit, when a termination resistance of one driver is assumed as a base, a termination resistance value of another driver is obtained by multiplying the base by a power of two.

(11) The data transmission circuit according to any one of (3) to (10), in which in the plurality of drivers of the second drive circuit, at least two or more of the drivers have the same termination resistance value.

(12) The data transmission circuit according to (1) or (2), in which the second drive circuit includes a plurality of current sources configured to supply current to an internal driver, and the operation state control circuit controls the operation state of the second drive circuit by controlling the number of operating current sources among the plurality of current sources of the second drive circuit.

REFERENCE SIGNS LIST

110 Main drive circuit
111 Driver
120 Dummy drive circuit
121 Driver
128 Current source
130 Data generation circuit
140 Operation state control circuit
141 Termination resistance code main table
142 Termination resistance code dummy table
145 Switch

The invention claimed is:

1. A data transmission circuit, comprising:
a first drive circuit configured to drive first data that transitions or does not transition in synchronization with a clock signal, wherein
the first drive circuit includes a plurality of drivers;
a second drive circuit configured to drive second data that transitions at a timing at which the first data does not transition in synchronization with the clock signal, wherein
the second drive circuit includes a plurality of drivers; and
an operation state control circuit configured to:
individually control an operation state of the first drive circuit and an operation state of the second drive circuit-circuits;
control the operation state of the second drive circuit, wherein the operation state of the second drive circuit is controlled based on a number of operating drivers among the plurality of drivers of the second drive circuit;
generate a first control signal and a second control signal, wherein the first control signal indicates presence or absence of a first operation, based on a first bit pattern, for each of the plurality of drivers of the first drive circuit, the second control signal indicates presence or absence of a second operation, based on a second bit pattern, for each of the plurality of drivers of the second drive circuit, and the second control signal is based on a bit-shifting operation, of at least a part of the first bit pattern of the first control signal, in a specific direction.

2. The data transmission circuit according to claim 1, further comprising a data generation circuit configured to:
generate first serial data as the first data, based on conversion of input parallel data;
generate second serial data as the second data.

3. The data transmission circuit according to claim 1, wherein
a shift amount of the bit-shifting operation is an integer value.

4. The data transmission circuit according to claim 1, wherein
a shift amount of the bit-shifting operation is a decimal value different from an integer.

5. The data transmission circuit according to claim 1, wherein
the operation state control circuit is further configured to generate, by the plurality of drivers of the second drive circuit, the second control signal based on a termination resistance.

6. The data transmission circuit according to claim 5, wherein
the operation state control circuit is further configured to generate the second control signal based on a current consumption in the plurality of drivers of the second drive circuit.

7. The data transmission circuit according to claim 1, wherein
the second drive circuit further includes, in at least one stage, a driver group including the plurality of drivers, of the second drive circuit, multistage-connected in series, and
the second control signal is for the plurality of drivers, of the second drive circuit, in an arbitrary stage of the second drive circuit.

8. The data transmission circuit according to claim 1, wherein
a termination resistance of a first driver, of the plurality of drivers of the second drive circuit, is a base, and
a termination resistance value of a second driver, of the plurality of drivers of the second drive circuit, is based on multiplication of the base by a power of two.

9. The data transmission circuit according to claim 1, wherein
at least two or more of drivers, of the plurality of drivers of the second drive circuit, have a same termination resistance value.

10. The data transmission circuit according to claim 1, wherein
the second drive circuit further includes a plurality of current sources,
the plurality of current sources is configured to supply current to an internal driver, and
the operation state of the second drive circuit is controlled based on a number of operating current sources among the plurality of current sources of the second drive circuit.

* * * * *